United States Patent [19]

Ribadeau-Dumas et al.

[11] Patent Number: 5,470,591
[45] Date of Patent: Nov. 28, 1995

[54] SWEETENING SYRUP BASED ON MALTITOL AND CONFECTIONERY USING THIS SYRUP

[75] Inventors: Guillaume Ribadeau-Dumas, Lambersart; Catherine Fouache, Sailly Labourse; Michel Serpelloni, Beuvry les Bethune, all of France

[73] Assignee: Roquette Freres, France

[21] Appl. No.: 197,476

[22] Filed: Feb. 16, 1994

[30] Foreign Application Priority Data

Feb. 16, 1993 [FR] France .................................. 93 01738
Feb. 18, 1993 [FR] France .................................. 93 01864

[51] Int. Cl.⁶ .............................. A23G 3/00; A23G 3/30
[52] U.S. Cl. .............................. 426/3; 426/572; 426/658; 426/660
[58] Field of Search .................................. 426/658, 660, 426/572, 3, 4

[56] References Cited

U.S. PATENT DOCUMENTS

| | | | |
|---|---|---|---|
| 2,436,967 | 3/1948 | Leuck | 127/40 |
| 2,719,179 | 9/1955 | Mora et al. | 260/209 |
| 3,766,165 | 10/1973 | Rerrhard et al. | 426/658 |
| 4,279,931 | 7/1981 | Verwaerde et al. | 426/48 |
| 4,497,846 | 2/1985 | Boursier et al. | 426/660 |
| 4,528,206 | 7/1985 | Kastin | 426/660 |
| 4,623,543 | 11/1986 | Motegi et al. | 426/103 |
| 4,849,023 | 7/1989 | Devos et al. | 127/40 |
| 4,917,916 | 4/1990 | Hirao et al. | 426/658 |
| 4,965,354 | 10/1990 | Yanaki et al. | 536/124 |
| 5,017,400 | 5/1991 | Olinger et al. | 426/660 |
| 5,051,500 | 9/1991 | Elmore | 536/50 |
| 5,091,015 | 2/1992 | Bunick et al. | 127/30 |
| 5,314,701 | 5/1994 | Freres | 426/103 |

FOREIGN PATENT DOCUMENTS

| | | |
|---|---|---|
| 072080 | 1/1982 | European Pat. Off. . |
| 171964 | 7/1985 | European Pat. Off. . |
| 380248 | 1/1990 | European Pat. Off. . |
| 473333 | 8/1991 | European Pat. Off. . |
| 518770 | 6/1992 | European Pat. Off. . |
| 561090 | 12/1992 | European Pat. Off. . |
| 50-30703 | 12/1972 | Japan . |
| 51-34467 | 4/1973 | Japan . |
| 61-254148 | 5/1985 | Japan . |
| 01-12761 | 10/1985 | Japan . |
| 02-163101 | 12/1988 | Japan . |
| 92/12179 | 12/1991 | WIPO . |
| 92/14761 | 1/1992 | WIPO . |

OTHER PUBLICATIONS

"Malbit® and its applications in the food industry", I. Fabry in Developments in sweeteners, vol. 3, 1987, p. 86.
"J. Assoc. Off. Anal. Chem.", vol. 68, n° 2, 1985, p. 399.
"Structure and application of maltitol" in Dempun Kagaku, 1972, vol. 19, n° 3, pp. 139 to 150, T. Oda.

*Primary Examiner*—Jeanette Hunter
*Attorney, Agent, or Firm*—Larson & Taylor

[57] ABSTRACT

The subject of the invention is the use, as agent capable of controlling propagation of crystallization of maltitol present in a confectionery, of molecules having a molecular weight greater than 1,300. This use applies in particular to the preparation of boiled sugars and semicrystallized items.

The invention also relates to the use, in confectionery, of a sweetening syrup crystallizable to maltitol, having a bimodal composition spectrum and comprising more than 3% of an agent for controlling propagation of crystallization of maltitol having a molecular weight greater than 1,300.

16 Claims, No Drawings

SWEETENING SYRUP BASED ON MALTITOL AND CONFECTIONERY USING THIS SYRUP

The subject of the present invention is the use, for controlling propagation of crystallization of the maltitol present in a confectionery product, of molecules having a molecular weight greater than 1,300. This use applies in particular to the preparation of boiled sugars and semicrystallized items.

The subject of the invention is also a process permitting the control of propagation of crystallization of the maltitol contained in a sweetening syrup or a confectionery product, including in particular a boiled sugar or a semicrystallized item.

The invention also relates to the manufacture and use, in confectionery making, of a sweetening syrup containing molecules with a molecular weight greater than 1,300. It finally relates, as new products, to the confectionery thus obtained and to the aforementioned sweetening syrup.

The term "boiled sugar" is understood to mean the confectionery products traditionally called hard boiled sweets, whether filled or otherwise, candied or otherwise, of brittle and glassy texture, which are obtained by extensive dehydration of a syrup of sugars or polyols. These products may or may not contain pharmaceutical active ingredients or substances having dietetic properties.

The expression "semicrystallized items" denotes confectionery items in which the sugars or polyols used exist in a crystallized state and also in an amorphous state. This expression encompasses in particular, without the list being limitative, chewing gums, chewing pastes, fondants, caramels, fudges, nougats and soft sugar-coated layers. These items may also contain pharmaceutical active ingredients or substances having dietetic properties.

For the purposes of the present invention, a sweetening syrup or a confectionery product are termed "crystallizable" if a boiled sugar containing 0.5 to 5.0% water and prepared from the said syrup or from the sweetening filler of the said confectionery, has the capacity to crystallize and to lose its glassy appearance over at least a portion of its surface because of the appearance of microcrystals of maltitol, within a period of 30 days, when it is placed at 20° C. and at 66% relative humidity. Sweetening filler of a confectionery product is understood to mean all the carbohydrates, optionally hydrogenated, entering into the manufacture of the confectionery. These carbohydrates may have both a filling role and a sweetening role in the confectionery.

Various maltitol syrups are known which are commonly used in the so-called "sugar-free" confectionery. All of them have major faults when they are used specifically in the manufacture of boiled sugars and semicrystallized confectionery items.

Some of them, containing less than 60% maltitol, may be considered as low in maltitol. There may be mentioned for example one of the most widely known syrups, marketed under the name LYCASIN®80/55 by the Applicant Company. The syrups sold under the trade marks POLYSORB®, HYSTAR® and MALTIDEX® 200 can also be mentioned.

Generally, such syrups are always non-crystallizable and high in sorbitol or in polysaccharides with a molecular weight greater than 1,300 daltons. The latter are far from fully satisfying confectionery manufacturers with respect to the applications defined above, so that they tend to be replaced by other so-called second-generation polyols. Indeed, they are considered to have several major faults. There may be mentioned in particular their high hygroscopicity, which is of course variable with the average molecular weight of the syrup considered, but which always results, in the case of the confectionery of interest within the framework of the present invention, in an excessive sticking to the wrapping and a variation in their texture over time.

A second fault is linked to their inadequate sweetening power. It is normally necessary to enhance the organoleptic qualities of confectionery prepared with such syrups by resorting to intense sweeteners, known to be either unstable or to have unsatisfactory taste, and by choosing flavourings specially developed for sugar-free confectionery.

The third, very damaging fault which is attributed to them relates to their cariogenic character, when they contain high levels of hydrogenated polysaccharides with a degree of polymerization greater than 20. It is commonly admitted nowadays that when these levels are greater than 3%, as taught in Patent FR 2,444,080, maltitol syrups are cariogenic. This removes the possibility of promoting this essential characteristic to consumers, and of effectively combatting dental caries which, according to WHO, is a real scourge, especially in children, who are highly fond of confectionery.

Other syrups, with high maltitol content contain 65 to 77% thereof. There may be mentioned in particular the syrups MALTISORB®75/75, MALTIDEX®100, FINMALT® and MALBIT®. These syrups are most often non-crystallizable. Although they are generally judged to be sufficiently sweet and non-cariogenic because of their very low content of hydrogenated polysaccharides with a degree of polymerization greater than 20, a content which is always at a level less than a few per cent, these syrups are criticized for being insufficiently viscous. The use of such syrups is accompanied by an excessive softness of the massecuite, such that in order to overcome it, it is necessary to use cookers and plants specially designed to this effect, which are different from those normally encountered in confectionery-manufacturing units, and which are more expensive to buy. The problem presents itself, as it can be understood, in even more critical terms during continuous manufacture.

A second faults of these syrups lies in their hygroscopic character, which is even higher than that described above in the case of syrups containing less than 60% maltitol.

A third class of maltitol syrups has already been used especially by the company RETTIG in FINLAND, since 1986, in the manufacture of boiled sweets marketed under the trade mark PASTIROL®. These syrups, which are always crystallizable, have also been tested, apparently unsuccessfully, by other companies. They are the same syrups as those mentioned above but enriched with maltitol by the addition of crystallized maltitol, or even the syrups marketed under the trade marks MALTISORB®70/86 and MALTIDEX®080. Such compositions are also described in Example 4 of Patent EP 185595 of which the Applicant is proprietor. It should be noted that these syrups are extremely low in oligosaccharides and polysaccharides and contain less than 1% on a dried basis, thereof.

The main disadvantage of these very high maltitol syrups lies in the fact that they are responsible for a highly unpredictable graining of confectionery. The term graining denotes, for a person skilled in the art, an uncontrolled crystallization over time, which is impossible to stop at a desired level. In the case of boiled sugars, the final products may, for a specifically determined syrup, according to the case, either become very sticky and flow while preserving, for the most part, a glassy appearance, or on the contrary become matt and opaque and crystallize over time, from their surface through to the core. They resemble, in this case, barley sugars which, as it is known, are very different from the desired products.

The same is true of semicrystallized confectionery. In this case as well, there is observed either a lack of crystallization, resulting in extreme softness of the final products, causing manufacturing difficulties which are difficult to overcome, or in a graining of the product over time, the latter taking on, in this case, a sandy and brittle texture. At worst, as in the case of chewing pastes, the product becomes completely powdery, without any binding.

Moreover, various compositions containing high maltitol contents are known. There may be mentioned:

that described in U.S. Pat. No. 5,017,400 (Ex. 3), which is used for preparing boiled sweets. It contains 10% xylitol expressed on a dried basis. There is no question of using xylitol as agent for controlling the propagation of maltitol. Indeed, its use is restricted to enhancing the sweet taste of sweets. It should be noted, moreover, that xylitol, because of its very low molecular weight, which is equal to 152, necessarily confers a very high hygroscopicity on the sweets.

that claimed in Patent EP 171 964, which contains 60 to 80% maltitol, but also 12 to 14% sorbitol. This composition is used because of its special humectant properties in the manufacture of certain dietetic products. Quite evidently, a crystallization of maltitol and a control of its propagation is not desired in this case either, but on the contrary an absence of crystallization, so as to obtain the desired optimal humectant properties. It is known indeed that these properties exist, both for sugars and for polyols, only when they are present in the dissolved state, and therefore non-crystallized.

that described in Patent JP 51-34467, which is used to manufacture boiled sugars. This composition comprises 30% starch hydrolysate and 5% gum arabic, combined with a maltitol-based composition. In the present case, the starch hydrolysate-gumarabic combination is used to enhance the theological properties of the maltitol massecuites. The maltitol content of this composition is not specified. Furthermore, as verified by the Applicant, this combination is unsatisfactory since it results in the production of brownish and cariogenic products because of the presence of a starch hydrolysate which is not reduced by hydrogenation.

that described in U.S. Pat. No. 4,623,543 (Ex. 1), which is useful for the manufacture of sugar-coated sweets. These comprise a centre consisting of a reduced maltose syrup called "MALTI TOWA" and a hydrogenated starch hydrolysate "PO40". The very low maltitol content of this composition means that it is not crystallizable and that in fact there is no need to try to control the propagation of maltitol in these sweets. Note that the stabilization of the sweets with respect to moisture is provided otherwise than by a microcrystallization of this syrup at their surface, that is to say by a sugar-coating step which is always difficult to apply industrially.

that described in Patent Application JP 61 254 148, used with the aim of preparing low-calorie confectionery. The latter contain, as mass sweetener, 100 parts of a sugar alcohol which may be maltitol, and 40 to 10,000 parts of polydextrose. In fact, the latter is used because of its low calorific value. This composition can contain a maximum of only 71% maltitol. The main disadvantage of this composition lies in the fact that it is cariogenic and that it becomes coloured during boiling because of the presence of free glucose molecules in the polydextrose.

that described in Patent EP 94 292, of which the Applicant is proprietor, which is useful in the manufacture of sweets and containing 1 to 8% gum arabic or 0.2 to 2% carboxymethylcellulose combined with a hydrogenated starch hydrolysate containing less than 80% maltitol and 0.1 to 19% sorbitol. These products are in reality added only to syrups containing less than 55% maltitol and optionally mannitol, with the aim of reducing the flow of the sweets. There is no question in this patent of controlling crystallization of mannitol and of avoiding any graining of the confectionery due to this molecule. Furthermore, practical experience has made it possible to observe that gum arabic and carboxymethylcellulose have the faults of inducing a brown or green colour which is undesirable for certain types of sweets, of adversely affecting their taste qualities, and of rendering the massecuite too elastic and its moulding difficult.

that described in Patent JP 50 30703, which describes a process for the manufacture of sweets not sticking to the teeth. This composition contains an organic hydrophilic agent with a molecular weight greater than 5,000, which is chosen from a group of extremely varied products. This agent is incorporated in an amount of 0.001 to 20% relative to the dry weight of maltitol. The reduced maltose syrup used is in fact the syrup marketed under the trade mark "MALBIT®LIQUIDE", known to contain only 73% and 77% maltitol, as recalled by I. FABRY in "MALBIT® and its applications in food industry" in "Development in Sweeteners" Vol. 3, 1987, p. 86. It should be noted that at no point is there indicated in this document the advantage of choosing a hydrophilic agent, which preferably remains colourless upon boiling and which is non-cariogenic, for controlling propagation of crystallization of maltitol.

It is after having identified and analysed the faults of the maltitol compositions and syrups of the prior art, in the light of the problems encountered by confectionery manufacturers, that the Applicant realized that an effective agent for controlling propagation of crystallization of maltitol in the aforementioned confectionery, capable of being directly used, without the slightest disadvantage, in the manufacture of a special maltitol syrup for confectionery, was still being sought at the present time. The said syrup would make it possible to prepare confectionery having the advantageous characteristics, which had always appeared irreconcilable, of being simultaneously:

highly sweet because of the very high maltitol content of the syrup, very mildly hygroscopic, non-cariogenic, and of high quality and high stability.

The Applicant realized, quite unexpectedly, that it was possible, firstly, to dispense with the systematic and disadvantageous use of intense sweeteners and with the use of special water-proof packagings during the manufacture of the confectionery products which, in addition, have the advantage of being non-cariogenic, and of having a texture and an appearance which are stable over time; and that it was possible, secondly, to appreciably reduce the overall costs of manufacturing this confectionery compared with conventional syrups having comparable high levels of maltitol, by resorting to a sweetening syrup crystallizable to maltitol (in the sense defined above), having a bimodal composition spectrum, and comprising more than 3% expressed on a dry matter basis of molecules having a molecular weight greater than 1,300 daltons.

Preferably, this sweetening syrup contains:

78 to 95% maltitol, less than 5% hydrogenated monosaccharides with a molecular weight of less than or equal to 182 daltons, 3 to 19% of molecules having a molecular weight greater than 1,300 daltons, which are used as agent for controlling propagation of crystallization of maltitol.

Preferably, the maltitol content of the said sweetening syrup is between 80 and 95%.

The present invention therefore also relates to the use of a sweetening syrup having the characteristics defined above and comprising, relative to its dry matter content, 78 to 95%, and preferably 80 to 95% maltitol, less than 5% hydrogenated monosaccharides with a molecular weight of less than or equal to 182, and 3 to 19% of molecules having a molecular weight greater than 1,300 daltons.

It was not evident that such a syrup could have all the qualities required for shaping boiled sugars or semicrystallized confectionery items, that is to say which are both easy to produce, stable, non-cariogenic and of excellent organoleptic qualities.

The Applicant firstly became aware, surprisingly and unexpectedly, that although maltitol has numerous similarities with sugar from the point of view of the organoleptic, physico-chemical and functional properties and that the behaviours of these two products in confectionery is generally considered to be very similar (reference can be made for example to the book published by T.H. GRENBY, "Developments in sweeteners—2", Applied Science Publishers LTD 1983, page 73, and to the communication by T. Oda "Structure et applications du maltitol" [Structure and applications of maltitol] in Dempum Kagaku, 1972, Vol. 19, No. 3, pp. 139 to 150), there is a basic property which is very different between the two molecules: that linked to their kinetics of propagation of crystallization. In other words, the Applicant realized that in the case of maltitol, when a crystallization is induced by nuclei, the kinetics of crystallization is always difficult to control, contrary to that of sugar. That is to say that this kinetics is either too high or too low, thereby generating enormous difficulties during the manufacture of confectionery, as well as problems of their stability over time.

The Applicant has therefore found a very effective means for achieving the control of propagation of crystallization of maltitol and has developed a process for controlling propagation of crystallization of the maltitol contained in a crystallizable sweetening syrup or a confectionery product such as in particular a boiled sugar or a semicrystallized item. The Applicant observed that while all the molecules other than maltitol can be considered as good anticrystallizing agents for maltitol, it is still the case that all these molecules do not permit a real control of propagation of crystallization of maltitol. The Applicant has observed, indeed, that the best agents for controlling this propagation are not the molecules normally present in maltitol syrups, namely sorbitol, maltotriitol and low-molecular weight hydrogenated oligosaccharides. These molecules are found to be solely good inhibitors of crystallization when they are present in high concentration, or alternatively mere retarders of crystallization at low concentration insofar as they retard, in this case, solely over time, the time of appearance of maltitol crystals, such that the problem described above cannot be solved by the use of such molecules. In conformity with the invention, it was found that molecules with a substantially higher molecular weight, greater than 1,300, preferably greater than 2,000, and more preferably greater than 3,000 daltons, proved to ideal agents for controlling the crystallization of maltitol in confectionery. These molecules are always absent, or are present solely in trace amounts, in the high-maltitol syrups marketed up until now, because of their modes of manufacture.

The Applicant has, in addition, discovered that the said molecules may be chosen from polysaccharides obtained by hydrolysis of starch, potato starch or dextrin, or from products predominantly composed of 1–6 bonds obtained by condensation or rearrangement from glucose or from one or more optionally reduced sugars, by the combined action of heat and acids in a practically anhydrous medium. These latter products, which will be called hereinafter "polyglucose" have been described many times in the literature, and in particular in U.S. Pat. Nos. 2,436,967, 2,719,179, EP 380 248, U.S. Pat. Nos. 3,766,165, 4,965,354, EP 473 333, U.S. Pat. Nos. 5,091,015, 5,051,500, JP 01-12761, JP 02-163101, WO 92/12179, WO 92/14761 and EP 561 090. In particular, the products marketed under the generic name of polydextrose can be used to achieve the objective set.

Following this surprising observation, the Applicant developed the new sweetening syrups, conforming to the invention, described above, which are particularly suitable for the manufacture of confectionery such as boiled sugars and semicrystallized items.

In so doing, the Applicant verified that below 80–81% maltitol, the boiled sugars obtained with commercial maltitol syrups are always highly hygroscopic and sticky like those prepared with less than 45% sucrose. This is due to the absence of surface microcrystallization. On the other hand, above 82–83% maltitol, the boiled sugars which are slightly sticky at the beginning, tend to acquire, after a few days at room temperature, a dry and non-sticky surface, like ordinary boiled sugars containing 50 to 60% sucrose. Subsequently, over time, these maltitol sweets, when they are prepared from prior art syrups such as for example the syrup MALTISORB®70/86, have a damaging tendency of becoming rapidly opaque and of graining, contrary to the control boiled sugars. It may be noted at this stage of the presentation of the problem that it is surprising to observe that maltitol crystallizes from a glass at a saturation level which is substantially greater than that of sucrose, although the solubility of maltitol is lower at room temperature than that of sugar. Logically, the opposite was expected.

In the light of these tests, it appears clearly and in an unpredictable manner that the kinetics of propagation of crystallization of these two molecules are very different.

The Applicant Company subsequently demonstrated that it is only through the use of an agent for controlling propagation of crystallization of mannitol as defined above, that it is possible to prevent graining and to obtain confectionery products similar in stability to that of the control products. Moreover, such a level of stability can be obtained, surprisingly, with a maltitol concentration lower than usual, that is to say with less than 80–81% maltitol.

This said, when the maltitol content of these sweets is increased up to above 95% of its dry matter content, the control of propagation of crystallization of maltitol becomes very difficult because of the fact that the agent can now represent, in this case, at most only the balance for 100%, equivalent to 5%. Its concentration is, in this case, too low relative to the quantity of maltitol present. In addition to the increased risk of graining, these sweets are fragile and brittle, which makes their wrapping difficult.

The invention thus relates, in particular, to the use of a crystallizable sweetening syrup having a bimodal composition spectrum, and containing more than 3% of molecules having a molecular weight greater than 1,300 daltons, these constituting an agent or a means for controlling propagation of crystallization of maltitol.

According to a first essential characteristic of the invention, this syrup is crystallizable, that is to say that it makes it possible to obtain, as indicated above, boiled sugars having a capacity to crystallize and to lose their glassy appearance over at least a portion of their surface when they are placed under rigorously defined conditions.

According to a second essential characteristic of the invention, this sweetening syrup has a bimodal composition spectrum. This characteristic can be verified by high-performance liquid chromatography. Thus, it is sufficiently high in maltitol to be crystallizable and sufficiently high in molecules with a molecular weight grater than 1,300 for the propagation of crystallization of maltitol to be controlled. On the other hand, the sweetening syrup conforming to the invention is relatively low in maltotriitol and in low-molecular weight oligosaccharides when compared with commercial maltitol syrups.

Thus, its content of oligosaccharides having an intermediate molecular weight between that of maltitol and that of the agent for controlling propagation of crystallization of maltitol—that is to say a molecular weight of between 344 and 1,300 daltons—is normally between 0.1 and 15%, preferably between 1 and 12%, and still more preferably between 2 and 9%, the percentages being expressed on a dried basis relative to the dry matter content of the sweetening syrup.

Among these oligosaccharides, the content of maltotriitol or of molecules with a molecular weight close to that of maltotriitol is preferably between 0.1 and 14%, more preferably between 4 and 9%. Presented in terms of the quantity, expressed on a dried basis, of maltitol present in the sweetening syrup conforming to the invention, this content is normally less than 16% and preferably between 5 and 12%.

According to a preferred characteristic of the invention, the sweetening syrup, which may be prepared or otherwise immediately before use, preferably contains less than 5%, and still more preferably less than 3% of molecules having a molecular weight of less than or equal to 182, the ideal situation being for it to contain less than 2% thereof. The Applicant has indeed observed that when this content was increased by a few per cent from this preferred value, for example by addition of sorbitol or xylitol, it was advisable, in this case, to increase the boiling temperatures by about 5° to 10° C. in order to obtain a plasticity for the massecuites similar to that of the ideal syrup of the invention, which is contrary to one of the desired objectives.

According to a third essential characteristic of the invention, this sweetening syrup contains more than 3%, preferably 5 to 19%, and still more preferably 7 to 19% of molecules having a molecular weight greater than 1,300, preferably greater than 2,000, and more preferably greater than 3,000 daltons, the said molecules playing the role of agent for controlling propagation of microcrystallization of maltitol.

According to a preferred characteristic of the invention, this sweetening syrup has a very high boiling stability. Preferably, it remains colourless after boiling at 170° C. in a test called "candy test" described below. This excludes the use, as preferred agent for controlling propagation of crystallization of maltitol, of substances unstable to heat, containing for example reducing sugars or proteins, such as in particular the natural gums extracted from plants and seeds, fructose polymers and celluloses.

The agent for controlling propagation of crystallization having a molecular weight greater than 1,300 daltons may be advantageously chosen from the hydrogenated polysaccharides obtained from native or modified starches. They may be linear or branched, according to whether they are obtained from a starch high in amylose or high in amylopectin.

In this case, it has been observed that when the maltitol contents are between 78% and 95%, and preferably between 80 and 95%, relative to the dry matter content, it was possible to prepare a syrup, and therefore confectionery, containing more than 3% of polysaccharides with a degree of polymerization greater than 20 without the said syrup being cariogenic, contrary to what was suggested by the indications contained in Patent FR 2 444 080. This seems to be linked to the fact that the maltitol contents of the syrups of the present invention are very substantially greater than those of the syrups claimed in this patent, the latter being between 45% to 60%.

It is possible, moreover, that this phenomenon also arises from the fact that the distribution of the i composition spectrum of the syrups used in the invention is bimodal and not substantially unimodal like that of the prior art syrups. It should be noted that extensive hydrolysis of starch by the use of β-amylase, α-amylase and isoamylase, as currently practised, makes it possible to obtain syrups, so to speak, free of high-molecular-weight polysaccharides, and therefore with a spectrum which is always unimodal.

The molecules used in conformity with the invention for controlling propagation of crystallization of maltitol may also be chosen very advantageously from polysaccharides, hydrogenated or otherwise, derived from the hydrolysis of a dextrin. For the definition of the word "dextrin", reference can be made if necessary to the ISO 1227 Standard of 1979. It is clear that these polysaccharides may be selected or fractionated, for example by the use of continuous chromatographic systems.

Insofar as their molecular weight is indeed greater than 1,300 daltons, polyglucoses are also particularly suitable. They are preferably hydrogenated and optionally chromatographed.

It should be noted at this stage of the presentation of the invention that it is not necessary in order to obtain the desired result, namely the control of propagation of crystallization of maltitol, to resort necessarily to molecules of polysaccharide nature, which are usually considered as "fibres", that is to say considered as being mostly non-hydrolysable under the action of enzymes such as amyloglucosidase.

Indeed, as already indicated above, the hydrogenated polysaccharides obtained from native starch, just like commercial polydextroses, have proved to be very good agents for controlling propagation of crystallization of maltitol, without as a result being "fibres" in the sense of the method described in "J. Assoc. Off. Anal. Chem." Vol. 68, No. 2, 1985, p. 399. It is easy to demonstrate that both types of products mentioned above contain less than 0.5% and 5% of fibres respectively according to the standardized Sigma procedure No. TD FAD (6.91) derived directly from this method.

Moreover, the molecules used in conformity with the invention for controlling propagation of crystallization of maltitol are necessarily highly soluble in water so that they do not confer on the confectionery in which they are used a rough or fibrous character, which is unpleasant in the mouth.

Another preferred characteristic of the sweetening syrup used in conformity with the invention lies in its non-cariogenicity, that is to say in its property to cause only a very slight acidification in the mouth, contrary to classical conventional sugars such as glucose, fructose, sucrose or alternatively glucose syrups. In order to obtain such a result, it is advisable that the syrup should be free of monosaccharides or disaccharides such as, in particular, glucose, maltose, fructose, sucrose, lactose and xylose. Furthermore, it is clear that it is imperative to adapt the content of agent for controlling propagation of crystallization of maltitol according to whether hydrogenated polysaccharides derived from potato starch or from hydrolysed starch, hydrogenated or non-hydrogenated polysaccharides derived from the hydrolysis of a dextrin, or alternatively hydrogenated polyglucoses, are used. Preferably, this content of controlling agent will be the nearest possible short of the maximum concentration for cariogenicity. This value is variable from one controlling agent to another. To determine this value and to control the non-cariogenic character of the maltitol syrup of the invention, the test described below is used, which is based on the in vitro determination of the acidification of a given quantity of material after inoculating the medium with saliva obtained from several donors, compared with a control culture broth containing no carbohydrate. The aim is to detect a fall in pH over time for the product to be tested, compared with a control. It should be underlined that this test alone is not sufficient to absolutely characterize the non-cariogenicity of a product because the results may vary according to the quality of the saliva used. It is advisable to supplement it with in vivo measurements such as those commonly performed by Dr. IMFELD of the University of Zurich in SWITZERLAND. This test makes it possible, nevertheless, in a very simple manner and at a very low cost, to perform valid comparisons between different products.

The detailed procedure for this test is the following.

A series of tubes are prepared containing 10 ml of a nutrient culture medium (trypticase medium at 2% of dry matter content), free of sugar, at pH 7, and these tubes are sterilized by subjecting to an autoclave treatment at 120° C. for 20 minutes.

In a first series of five tubes, 1 ml of sterile water is introduced in order to make a control series.

In a second series of five tubes, 1 ml of an 18% (w/v) solution of the product to be tested is introduced.

The five tubes of each series are then inoculated with the same volume of 0.2 ml per tube of a dilution of human saliva obtained from five donors.

The formation of acids is then monitored by measuring the pH, a first measurement being carried out before incubation and the other measurements being carried out after incubations at 30° C. for 3, 6, 13, 18 and 21 hours respectively.

For a product to be considered non-cariogenic within the meaning of this B test, the difference in pH observed between the control after 21 hours and the product to be tested after 21 hours should not be too pronounced and, in practice, at most equal to 1 pH unit.

As regards the preparation of the maltitol syrups conforming to the invention, there may be carried out, with no limitation being implied, according to one of the methods described below:

the mixing, in the correct proportions, of a high maltose syrup and at least one of the controlling agents defined above, then the hydrogenation of this mixture, its purification in a manner known per se, and its concentration.

the preparation of a special high maltose syrup, high in polysaccharides having a molecular weight greater than 1,300 daltons, by carrying out a very slight acid or enzymatic prehydrolysis of a potato starch or of a starch and a hydrolysis by a β-amylase, avoiding the use of other enzymes such as in particular an isoamylase or a pullulanase, then the hydrogenation of the syrup obtained, its purification and its concentration. In this case, it is preferable to carry out, either before hydrogenation, the addition of a conventional high maltose syrup, or after hydrogenation, the addition of maltitol so as to finally obtain the desired quantity of maltitol.

or the concentration of a mixture, in the correct proportions, of a syrup with a very high maltitol content which is obtained for example according to Patent EP 185 595, of which the Applicant is proprietor, or alternatively of powdered maltitol, partially or totally crystalline, and of at least one of the abovementioned controlling agents, optionally hydrogenated and/or fractionated by chromatography.

It should be noted that this last method may also be suitable for the manufacture of the confectionery conforming to the invention.

As regards the water concentration of the sweetening syrup used according to the invention, a dry matter content such that the syrup is supersaturated with maltitol and such that the latter is present in an amorphous state is preferably chosen. In general, it is greater than 60%, preferably greater than 65% and more preferably close to 70%.

Furthermore, as said above, this sweetening syrup preferably remains colourless after boiling at 170° C. in a test called "candy test" described below.

This test consists in heating to 170° C. a sample of 260 g of syrup to be tested, placed in a boiling vessel made from copper, over an electric plate, and then shaping the massecuite so as to obtain boiled sugars. The colour of these boiled sugars is evaluated using a Helige colorimeter equipped with colour discs. The values obtained according to this test are normally between 3 and 20 HBC units. The sweetening syrup conforming to the invention is colourless when the result obtained under these conditions is judged to be less than 3 HBC units.

The confectionery prepared from the sweetening syrup conforming to the invention advantageously contains 2 to 99% thereof, according to the nature of this confectionery.

For example, chewing gums can be prepared with only 2 to 20% of this syrup, whereas boiled sugars can be manufactured practically exclusively with it.

As regards in particular the manufacture of boiled sugars, it is possible for example to:

concentrate, up to more than 95% of dry matter content, a sweetening syrup conforming to the invention, or a composition containing it, and to then carry out the ordinary steps of flavouring and shaping by casting or moulding.

separately concentrate, on the one hand, a sweetening syrup conforming to the invention or a composition containing it, and, on the other hand, a syrup containing up to 100%, relative to its dry matter content, of a sweetening product easily crystallizable in a form which is not very hygroscopic, such as isomaltulose, hydrogenated isomaltulose or isomalt, mannitol, erythritol or mixtures thereof, and to then carry out the flavouring of the massecuites and then finally to form them, so as to obtain double-layered sweets as indicated in Patent Application EP 518 770, of which the Applicant is proprietor. Preferably therefore, the sweets obtained will have an external layer representing less than 50% of the sweet and containing the sweetening product easily crystallizable in a non-hygroscopic form and a centre comprising the sweetening syrup according to the invention or the composition containing it, in a concentrated form.

The invention will be more clearly understood with the aid of the following examples.

EXAMPLE 1

Preparation of sweetening syrups useful for the manufacture of confectionery conforming to the invention 12 liters of a syrup solely composed of a yellow dextrin marketed by the Applicant under the trade mark TACKI- DEX® DF 165, are introduced into a stirred and thermostated 25-liter tank. The pH is adjusted to 5.5 and the temperature of the syrup is adjusted to 55° C. There is added 0,015°/°° of β-amylase SPEZYME®DBA, then after 48 hours of saccharification, 1°/°° of α-amylase MAXAMYL® HT 3000. The temperature is maintained close to 55° C. and the saccharification is stopped after 88 hours. The hydrolysate obtained is then purified, it is concentrated to 40% DM before hydrogenating it under the usual conditions, so as to obtain a reducing sugar level of less than 0.5%.

The titer of the composition obtained is then:

4.8% sorbitol 14.9% maltitol 56.4% of polysaccharides with a molecular weight greater than 1,300.

A syrup which is very high in maltitol, obtained exactly as described in Patent EP 185 595 and having a titer of 95% maltitol expressed on a dried basis, is then added to this composition so as to obtain the following three sweetening syrups conforming to the invention. These contain 82, 84 and 86% maltitol respectively.

By way of comparison, the compositions of three commercial prior art syrups are also given, one containing about 82% maltitol, the second about 84% and the last about 86% maltitol.

| Composition of the dry matter in % | Syrups according to the invention | | | Prior art syrups | | |
|---|---|---|---|---|---|---|
| (HPLC method) | 182 | 184 | 186 | A82 | A84 | A86 |
| Sorbitol | 1.0 | 0.9 | 0.8 | 2.2 | 4.4 | 6.3 |
| Other hydrogenated monosaccharides | 0.3 | 0.3 | 0.2 | 0.2 | 0.3 | 0.9 |
| Maltitol | 82.0 | 84.0 | 86.0 | 81.7 | 84.1 | 85.7 |
| Maltotriitol | 1.2 | 1.1 | 1.0 | 10.2 | 8.6 | 5.0 |
| Other hydrogenated oligosaccharides | 3.6 | 3.1 | 2.7 | 4.6 | 2.6 | 2.1 |
| Hydrogenated polysaccharides with a MW greater than 1,300 | 11.9 | 10.6 | 9.3 | 1.1 | traces | traces |

EXAMPLE 2

Comparison of the syrups used according to the invention with those of the prior art The physico-chemical and organoleptic properties of the sweetening syrups I82 and I86 conforming to the invention are compared with those of the maltitol syrups A82 and A86 of the prior art.

| | BROOKFIELD viscosities: | | | | |
|---|---|---|---|---|---|
| Dry matter content of the syrups | Temperature for measurement | Viscosity of the syrups | | | |
| | | 182 | 186 | A82 | A86 |
| 65% | 20° C. | 460 cps | 430 cps | 402 cps | 389 cps |
| 70% | 20° C. | 1460 cps | 1240 cps | 1000 cps | 980 cps |
| 65% | 30° C. | 235 cps | 225 cps | 180 cps | 175 cps |
| 70% | 30° C. | 520 cps | 444 cps | 430 cps | 410 cps |
| 65% | 40° C. | 125 cps | 117 cps | 100 cps | 98 cps |
| 70% | 40° C. | 256 cps | 240 cps | 200 cps | 188 cps |

The sweetening syrups according to the invent/on have higher viscosities than those of the prior art syrups, even at the same temperature and dry matter content.

| | Equilibrium relative humidities at 20° C.: | | | |
|---|---|---|---|---|
| Dry matter content of the syrups | Equilibrium relative humidity at 20° C. | | | |
| | 182 | 186 | A82 | A86 |
| 65% | 85.9% | 85.5% | 85.0% | 84.8% |
| 70% | 84.2% | 84.0% | 82.5% | 82.0% |

At the same maltitol content and the same dry matter content as the prior art syrups, the sweetening syrups of the invention have higher equilibrium relative humidities. The syrups of the invention are therefore relatively less hygroscopic.

Stability to boiling:

A test called "candy test" is carried out which consists in boiling a syrup under well defined conditions. This test is used routinely to assess the stability of glucose syrups.

Here, the boiling is performed at 170° C. compared with a product called polydextrose, marketed by the company PFIZER under the trade mark LITESSE®. Syrups I82 and I86 are very stable, as much as syrups A82 and A86. They remain non-coloured, contrary to the LITESSE® products.

Sweetening power:

These evaluations are carried out at room temperature in comparison with sucrose in solution at 10%. The syrups I82, I86, A82 and A86 all have a sweetening power close to 0.80.

Test of cariogenicity:

The procedure is carried out as indicated above.

Syrups I82 and I86, A82 and A86 can be considered as non-cariogenic.

EXAMPLE 3

Use in the manufacture of boiled sugars.

The sweetening syrups used are syrups I82, I86 and A82 which are presented in Example 1. They are used to prepare boiled sweets. The three compositions, with a dry matter content of 75%, are dehydrated by boiling over a naked flame and at atmospheric pressure, at temperatures of 160, 180° and 200° C.

Control sweets are obtained by carrying out, under the same conditions, the boiling:

of a mixture at 75% of dry matter content of glucose syrup ROCLYS®A3878S marketed by the Applicant and sucrose, in the respective proportions, expressed on a dried basis, of 70% and 30% (boiled sugars called S30).

of a mixture of 75% of dry matter content of the same two products but in respective proportions of 45% and 55% (boiled sugars called S55).

of a maltitol syrup MALTISORB®75/75 containing 77% maltitol (boiled sugars called A77).

| | Boiling points of the syrups: | | | |
|---|---|---|---|---|
| | Residual water content in % (Karl Fischer) after boiling at | | | |
| | | 160° C. | 180° C. | 200° C. |
| Examples according to the | Boiled sugars I82 | 2.4 | 1.6 | 1.0 |
| | Boiled sugars I86 | 2.3 | 1.7 | 0.8 |

-continued

Boiling points of the syrups:

|  |  | Residual water content in % (Karl Fischer) after boiling at | | |
|---|---|---|---|---|
|  |  | 160° C. | 180° C. | 200° C. |
| invention |  |  |  |  |
| Comparative | Builed sugars A77 | 2.3 | 1.3 | 0.9 |
| examples | Boiled sugars A82 | 2.5 | 1.8 | 1.1 |
|  | Boiled sugars S30 | 2.1 | / | / |
|  | Boiled sugars S55 | 2.0 | / | / |

Hygroscopicities of the boiled sugars:

The boiled sugars are placed in an atmosphere with 66% relative humidity in an air-conditioned room at 20° C. The water regain values are determined by weighing over time. The results obtained are presented in the table below.

|  |  | Water regain in % | | | | | |
|---|---|---|---|---|---|---|---|
|  |  | After one day | | | After six days | | |
|  |  | 160° C. | 180° C. | 200° C. | 160° C. | 180° C. | 200° C. |
| Examples | Boiled sugars 182 | 0.87 | 1.15 | 1.40 | 1.59 | 1.96 | 2.96 |
| according to the invention | Boiled sugars 186 | 1.17 | 1.09 | 1.11 | 2.26 | 1.80 | 2.17 |
| Comparative | Boiled sugars A77 | 1.80 | 1.97 | 2.10 | 7.02 | 8.24 | 8.50 |
| examples | Boiled sugars A82 | 1.79 | 1.95 | 2.06 | 4.56 | 5.76 | 6.40 |
|  | Boiled sugars S30 | 0.92 | / | / | 2.70 | / | / |
|  | Boiled sugars S55 | 0.80 | / | / | 1.30 | / | / |

It can be observed that the boiled sugars conforming to the invention exhibit behaviours similar to those of the prior art sweets with sucrose. These behaviours differ widely, on the other hand, from those of boiled sugars with maltitol of the prior art which are particularly hygroscopic and have a high tendency to flow during the water regain without being the seat for a surface microcrystallization of maltitol.

Sticking and graining tendencies:

The wrapped boiled sugars are stored at ordinary temperature without outer packaging. They are observed after 3 months.

|  |  | Stickiness to the wrapping | Graining |
|---|---|---|---|
| Examples | Boiled sugars 182 | No | No |
| according to the invention | Boiled sugars 186 | No | No, very slight surface whitening |
| Complete comparative | Boiled sugars A77 | Yes, very high | 'No |
| tive examples | Boiled sugars A82 | No | Yes |
|  | Boiled sugars S30 | Yes, high | No |
|  | Boiled sugars S55 | No | No |

Here again, the sweets obtained with the syrups of the invention behave particularly well, and in a manner similar to those containing 55% sucrose.

EXAMPLE 4

Use in the manufacture of chewing gums.

Two types of chewing gums are prepared containing two different sweetening fillers:

one corresponding to a known and already used composition based on a maltitol syrup marketed by the Applicant under the trade mark LYCASIN®80/55 and a high-purity crystallized maltitol powder also marketed by the Applicant under the trade mark MALTISORB®P, the other corresponding to a composition comprising, in identical proportions, the same crystallized maltitol powder and a syrup S having a dry matter content close to that of the syrup LYCASIN®80/55. This syrup, which provides the agents or molecules for controlling the propagation of maltitol, contains expressed on a dried basis:

sorbitol: 2.4% maltitol: 50.1% maltotriitol: 17.7% oligosaccharides with a molecular weight of between 344 and 1,300: 9.5% polysaccharides with a molecular weight >1,300: 20.3%

Thus, the sweetening fillers used comprise, expressed on a dry matter basis:

|  | According to the prior art (in %) | According to the invention (in %) |
|---|---|---|
| Sorbitol | 0.4 | 0.4 |
| Maltitol | 92.6 | 92.1 |
| Maltotriitol | 4.0 | 2.7 |
| Other oligosaccharides with MW of between 344 and 1,300 | 1.3 | 1.3 |
| Polysaccharides with MW >1,300 | 1.3 | 3.1 |
| Glycerin or: | 0.4 | 0.4 |
| Oligosaccharides having a MW of between 344 and 1,300 | 5.3 | 4.0 |
| Maltotriitol relative to the quantity of maltitol expressed on a dried basis | 4.3 | 2.9 |

These two sweetening fillers are crystallizable because boiled sugars prepared from them, when placed at 66% relative humidity and at 20° C., tend to crystallize at the surface, becoming less transparent after a few days of exposure under these conditions.

Using these sweetening fillers, chewing gums are manufactured according to the following formula:

| | |
|---|---|
| Gum base (Dreyco ®): | 20.0% |
| Sweetening filler: | 75.5% |
| Water (provided by the sweetening filler): | 3.9% |
| Flavouring: | 0.8% |

To carry out the manufacture, the gum base is softened by heating it to a temperature of about 70° C. and it is placed in a kneader preheated to 45°–50° C.

The maltitol syrup LYCASIN®80/55 or the syrup S preheated to 45° C. is added thereto and the mixture is kneaded for two minutes.

A third of the crystallized maltitol powder MALTISORB®P is then added and further kneaded for two minutes, after which a third of the maltitol powder is again introduced.

After kneading for two minutes, the rest of the maltitol powder is added, and then flavouring and glycerin.

The kneading is carried out for a further two minutes, then the paste is rolled out and cut.

The hardness, at 20° C., of chewing gum pieces, 5 mm thick, is measured over time by penetrometry, by means of an INSTRON® type apparatus.

The results are the following:

| Hardness | Chewing gums comprising the sweetening filler of the prior art | Chewing gums comprising the sweetening filler according to the invention |
|---|---|---|
| Day of manufacture D0 | 23.6 N | 20.2 N |
| D0 + 1 day | 29.4 N | 26.5 N |
| D0 + 30 days | 32.5 N | 28.6 N |

The chewing gums prepared using agents for controlling propagation of crystallization of maltitol, in an amount of 3.1% of sweetening filler, therefore have a texture which is always softer than that of chewing gums prepared according to the prior art.

Furthermore, the chewing gums according to the invention are less brittle, which indicates a lower propensity to crystallization of the syrupy phase over time.

Submitted to a specialized taste panel, the product according to the invention is judged superior because of its softer texture during chewing.

We claim:

1. In a process of manufacturing a maltitol based confectionery, the improvement comprising adding an agent for controlling propagation of crystallization of maltitol, said agent consisting of molecules having a molecular weight greater than about 1,300 daltons, said molecules being selected from the group consisting of:

linear or branched hydrogenated polysaccharides obtained from native or modified starch, non hydrogenated or hydrogenated polysaccharides obtained from hydrolysis of dextrin, non hydrogenated polyglucoses or hydrogenated polyglucoses.

2. The process according to claim 1, wherein the agent contains molecules having a molecular weight greater than about 2,000 daltons.

3. In a process of manufacturing a maltitol based confectionery, the improvement comprising adding a crystallizable maltitol composition having a bimodal composition spectrum and having, expressed on a dry matter basis, more than 3% of molecules having a molecular weight greater than about 1,300 daltons, said molecules being selected from the group consisting of:

linear or blanched hydrogenated polysaccharides obtained from native or modified starch, non hydrogenated or hydrogenated polysaccharides obtained from hydrolysis of dextrin, non hydrogenated polyglucoses or hydrogenated polyglucoses.

4. The process according to claim 3 wherein the crystallizable maltitol composition contains, expressed on a dry matter basis, from about 78% to about 95% maltitol, less than about 5% hydrogenated monosaccharides and from about 3% to about 19% of molecules having a molecular weight greater than about 1,300 daltons.

5. The process according to claim 3 wherein the crystallizable maltitol composition contains from 80 to 95% maltitol expressed on a dry matter basis.

6. A maltitol crystallizable sweetening composition having a bimodal composition spectrum, comprising, expressed on a dry matter basis, more than 3% of molecules having a molecular weight greater than about 1,300 daltons; the said molecules being selected from the group consisting of:

linear or branched hydrogenated polysaccharides obtained from native or modified starch, non hydrogenated or hydrogenated polysaccharides obtained from hydrolysis of dextrin, non hydrogenated polyglucoses or hydrogenated polyglucoses.

7. The maltitol crystallizable sweetening composition according to claim 6, wherein the maltitol content, expressed on a dry matter basis, is from about 78 to about 95%.

8. The maltitol crystallizable sweetening composition according to claim 6, having less than about 5% of hydrogenated monosaccharides, expressed on a dry matter basis.

9. The maltitol crystallizable sweetening composition according to claim 6, containing from about 3% to about 19% of molecules having a molecular weight greater than 1,300 daltons.

10. The maltitol crystallizable sweetening composition according to claim 9, containing from about 5% to about 19% of molecules having a molecular weight greater than 1,300 daltons.

11. The maltitol crystallizable sweetening composition according to claim 10, containing from about 7% to about 19% of molecules having a molecular weight greater than 1,300 daltons.

12. The maltitol crystallizable sweetening composition according to claim 6, wherein the molecules have a molecular weight greater than 2,000 daltons.

13. The maltitol crystallizable sweetening composition according to claim 6, wherein the molecules have a molecular weight greater than 3,000 daltons.

14. A maltitol based confectionery containing from about 2 to about 99% of a maltitol crystallizable sweetening composition according to claim 6.

15. The maltitol based confectionery according to claim 14 which is a hard boiled candy.

16. The maltitol based confectionery according to claim 14 which is a semi-crystallized product, selected from the group consisting of chewing gum, a chewy candy, a fondant, a fudge, a nougat or a soft coating.

* * * * *